US012638167B2

(12) United States Patent
Arpin et al.

(10) Patent No.: US 12,638,167 B2
(45) Date of Patent: May 26, 2026

(54) LIGHTING ASSEMBLIES WITH HEAT-DISSIPATING PROPERTIES PRINCIPALLY FOR SWIMMING POOLS AND SPAS

(71) Applicant: ZODIAC POOL SYSTEMS LLC, Carlsbad, CA (US)

(72) Inventors: Jonathan Arpin, San Diego, CA (US); Hwa Heng, Vista, CA (US); Barton Lu, Shanghai (CN); Evan Ackema, Carlsbad, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 0 days.

(21) Appl. No.: 18/142,167

(22) Filed: May 2, 2023

(65) Prior Publication Data

US 2023/0265997 A1 Aug. 24, 2023

Related U.S. Application Data

(63) Continuation of application No. 17/217,275, filed on Mar. 30, 2021, now Pat. No. 11,680,700, which is a (Continued)

(51) Int. Cl.

*F21V 29/00* (2015.01)
*F21V 15/01* (2006.01)

(Continued)

(52) U.S. Cl.

CPC ............ *F21V 29/503* (2015.01); *F21V 15/01* (2013.01); *F21V 23/006* (2013.01); *F21V 29/70* (2015.01);

(Continued)

(58) Field of Classification Search

None

See application file for complete search history.

(56) References Cited

U.S. PATENT DOCUMENTS 6,354,714 B1 3/2002 Rhodes
6,592,238 B2 7/2003 Cleaver et al.
(Continued)

FOREIGN PATENT DOCUMENTS

AU 2015271887 A1 1/2016

OTHER PUBLICATIONS

European Application No. 18795868.1, Office Action mailed on Oct. 9, 2023, 7 pages.

(Continued)

*Primary Examiner* — Gerald J Sufleta, II

(74) *Attorney, Agent, or Firm* — Kilpatrick Townsend & Stockton LLP

(57) ABSTRACT

Nicheless lighting assemblies principally for swimming pools and spa are detailed. The lighting assemblies include features configured to dissipate heat. The assemblies additionally are designed to reduce possibility of water intrusion. Some versions of the assemblies may include thermally-conductive plastic overmolded onto at least one of a lens or a heat spreader. Versions of the assemblies additionally or alternatively may include a generally annular heat sink to which a printed circuit board containing at least one light-emitting diode (LED) is attached. Versions of the assemblies may be divided into subassemblies, one subassembly fitting into another, or include protective covers.

15 Claims, 15 Drawing Sheets

Related U.S. Application Data continuation of application No. 16/152,592, filed on Oct. 5, 2018, now Pat. No. 11,035,564.

(60) Provisional application No. 62/703,241, filed on Jul. 25, 2018, provisional application No. 62/569,199, filed on Oct. 6, 2017.

(51) Int. Cl.

| | |
|---|---|
| ***F21V 23/00*** | (2015.01) |
| ***F21V 29/503*** | (2015.01) |
| ***F21V 29/70*** | (2015.01) |
| ***F21V 29/89*** | (2015.01) |
| ***F21V 31/04*** | (2006.01) |
| *F21V 29/56* | (2015.01) |
| *F21V 31/00* | (2006.01) |
| *F21W 131/401* | (2006.01) |
| *F21Y 115/10* | (2016.01) |

(52) U.S. Cl.

CPC .............. *F21V 29/89* (2015.01); *F21V 31/04* (2013.01); *F21V 29/56* (2015.01); *F21V 31/005* (2013.01); *F21W 2131/401* (2013.01); *F21Y 2115/10* (2016.08)

(56) References Cited

U.S. PATENT DOCUMENTS

| | | | | |
|---|---|---|---|---|
| 6,761,472 | B1* | 7/2004 | Cleaver | F21S 4/20 362/267 |
| 6,971,760 | B2 | 12/2005 | Archer et al. | |
| 8,172,434 | B1 | 5/2012 | Olsson | |
| 8,756,801 | B2 | 6/2014 | Nall et al. | |
| 8,827,508 | B2 | 9/2014 | Sagal | |
| 8,904,576 | B2 | 12/2014 | Claffey | |
| 10,030,400 | B2 | 7/2018 | Claffey | |
| 11,035,564 | B2 | 6/2021 | Arpin et al. | |
| 11,680,700 | B2 | 6/2023 | Arpin et al. | |
| 2004/0066650 | A1 | 4/2004 | Hung | |
| 2006/0002104 | A1 | 1/2006 | Willis et al. | |
| 2007/0139913 | A1 | 6/2007 | Savage | |
| 2007/0223226 | A1 | 9/2007 | Park | |
| 2009/0027900 | A1 | 1/2009 | Janos et al. | |
| 2010/0315815 | A1 | 12/2010 | Lin et al. | |
| 2011/0062469 | A1 | 3/2011 | Camras et al. | |
| 2011/0267834 | A1 | 11/2011 | Potucek et al. | |
| 2012/0014117 | A1* | 1/2012 | Huang | F21K 9/23 362/373 |
| 2012/0162783 | A1 | 6/2012 | Bemmerl et al. | |
| 2013/0039043 | A1 | 2/2013 | Doyle | |
| 2013/0039072 | A1 | 2/2013 | Kim et al. | |
| 2013/0094207 | A1* | 4/2013 | Negandhi | F21K 9/232 362/235 |
| 2013/0100651 | A1 | 4/2013 | Doyle | |
| 2014/0091697 | A1 | 4/2014 | Shum | |
| 2014/0268761 | A1 | 9/2014 | Raleigh et al. | |
| 2015/0092416 | A1 | 4/2015 | Potucek et al. | |
| 2015/0124435 | A1 | 5/2015 | Masterman et al. | |
| 2015/0247632 | A1* | 9/2015 | McGilvray | F21V 31/005 362/267 |
| 2015/0338074 | A1 | 11/2015 | Chen et al. | |
| 2015/0338080 | A1 | 11/2015 | Dexter et al. | |
| 2015/0369469 | A1 | 12/2015 | Vamberi | |
| 2015/0377472 | A1* | 12/2015 | Almosdi | B29C 45/14778 362/373 |
| 2016/0033122 | A1 | 2/2016 | Sakigawa et al. | |
| 2016/0084483 | A1 | 3/2016 | Dubuc et al. | |
| 2016/0084490 | A1 | 3/2016 | Davis et al. | |
| 2016/0215934 | A1 | 7/2016 | Klafta et al. | |
| 2016/0255705 | A1 | 9/2016 | Sagal et al. | |
| 2016/0320048 | A1 | 11/2016 | Daniels | |
| 2017/0023230 | A1 | 1/2017 | Britt | |
| 2017/0045214 | A1 | 2/2017 | Johnson | |
| 2017/0175992 | A1 | 6/2017 | Guillet et al. | |
| 2017/0297480 | A1 | 10/2017 | Elwell et al. | |
| 2018/0135323 | A1 | 5/2018 | Claffey | |

OTHER PUBLICATIONS

U.S. Appl. No. 16/152,592, Advisory Action mailed on Aug. 13, 2020, 6 pages.
U.S. Appl. No. 16/152,592, Final Office Action mailed on Apr. 7, 2020, 12 pages.
U.S. Appl. No. 16/152,592, Non-Final Office Action mailed on Mar. 2, 2021, 15 pages.
U.S. Appl. No. 16/152,592, Non-Final Office Action mailed on Oct. 30, 2019, 14 pages.
U.S. Appl. No. 16/152,592, Notice of Allowance mailed on Mar. 19, 2021, 8 pages.
U.S. Appl. No. 17/217,275, Corrected Notice of Allowability mailed on Feb. 28, 2023, 3 pages.
U.S. Appl. No. 17/217,275, Corrected Notice of Allowability mailed on Mar. 7, 2023, 3 pages.
U.S. Appl. No. 17/217,275, Corrected Notice of Allowability mailed on May 15, 2023, 3 pages.
U.S. Appl. No. 17/217,275, Non-Final Office Action mailed on Apr. 20, 2022, 11 pages.
U.S. Appl. No. 17/217,275, Non-Final Office Action mailed on Oct. 5, 2022, 11 pages.
U.S. Appl. No. 17/217,275, Notice of Allowance mailed on Feb. 6, 2023, 9 pages.
Australian Application No. 2018346609, First Examination Report mailed on Aug. 19, 2022, 3 pages.
Australian Application No. 2018346609, Second Examination Report mailed on Jan. 5, 2023, 3 pages.
Australian Application No. 2018346609, Third Examination Report mailed on Feb. 23, 2023, 3 pages.
European Application No. 18795868.1, Office Action mailed on Jun. 4, 2021, 6 pages.
International Application No. PCT/US2018/054541, International Preliminary Report on Patentability mailed on Apr. 16, 2020, 8 pages.
International Application No. PCT/US2018/054541, International Search Report and Written Opinion mailed on Feb. 1, 2019, 12 pages.
Australian Application No. 2023216855, First Examination Report mailed on Jun. 17, 2024, 7 pages.
Australian Application No. 2023216855, Third Examination Report mailed on May 16, 2025, 7 pages.
Australian Application No. 2023216855, Notice of Acceptance mailed on Jun. 12, 2025, 3 pages.
European Application No. 18795868.1, Intention to Grant mailed on Nov. 24, 2025, 7 pages.
Australian Application No. 2023216855, Second Examination Report mailed on Nov. 7, 2024, 6 pages.

* cited by examiner

LIGHTING ASSEMBLIES WITH HEAT-DISSIPATING PROPERTIES PRINCIPALLY FOR SWIMMING POOLS AND SPAS

CROSS-REFERENCE TO RELATED APPLICATIONS

This application is a continuation of U.S. patent application Ser. No. 17/217,275, filed on Mar. 30, 2021, and entitled LIGHTING ASSEMBLIES WITH HEAT-DISSIPATING PROPERTIES PRINCIPALLY FOR SWIMMING POOLS AND SPAS, which is a continuation U.S. patent application Ser. No. 16/152,592, now U.S. Pat. No. 11,035,564, filed Oct. 5, 2018, and entitled LIGHTING ASSEMBLIES WITH HEAT-DISSIPATING PROPERTIES PRINCIPALLY FOR SWIMMING POOLS AND SPAS, which claims the benefit of and priority to U.S. Provisional Patent Application Ser. No. 62/569,199, filed Oct. 6, 2017, and entitled LIGHTING ASSEMBLIES PRINCIPALLY FOR SWIMMING POOLS AND SPAS, and the benefit of and priority to U.S. Provisional Patent Application Ser. No. 62/703,241, filed Jul. 25, 2018, and entitled LIGHTING ASSEMBLIES PRINCIPALLY FOR SWIMMING POOLS AND SPAS, all of which are hereby incorporated by reference in their entireties.

FIELD OF THE INVENTION

This invention relates to immersed lighting assemblies principally for swimming pools and spas and more particularly, but not necessarily exclusively, to nicheless lighting having improved heat-dissipation properties.

BACKGROUND OF THE INVENTION

U.S. Pat. No. 6,971,760 to Archer, et al., whose contents are incorporated herein in their entirety by this reference, describes exemplary nicheless lighting systems for water-containing vessels such as swimming pools. As illustrated in FIGS. 4-5 of the Archer patent, a lens may cover an array of light-emitting diodes (LEDs) protruding through a perforated white or reflective plate. See Archer, col. 6, ll. 3-4 and 12-14. A fiber optic bundle may connect to the LEDs on a side of the plate opposite the lens, and control circuitry may be "located at a remote location outside of the pool." See id., ll. 23-25.

Because nicheless lights typically are smaller than traditional niched lights, they comprise less surface area over which to dissipate heat. To reduce risk of electrical shock, nicheless lights also should be free of metallic surfaces in contact with water of pools. This absence of external, thermally-conductive metallic surfaces further decreases ability of nicheless lights to dissipate heat.

Recognized by the Archer patent is that LEDs of these lighting assemblies indeed generate significant heat. Some versions of the lighting assemblies omit any lens and employ white plates and long, thick electrical leads as approaches to dissipating the generated heat. See id., col. 3, ll. 54-63. Pool water itself may also be used for this purpose. See id., col. 6, ll. 7-11.

SUMMARY OF THE INVENTION

The present invention provides different mechanisms for dissipating heat in lighting assemblies. The mechanisms may include metallic heat sinks and spreaders. Rather than omitting lenses, moreover, the lighting assemblies may include lenses and overmold thermally-conductive plastic material onto them and the heat spreaders. In particular, the present invention allows use of metals such as aluminum, which has good thermal conductivity, but maintains external surfaces of plastic materials which are not normally electrically conductive.

Also furnished by the present invention are lighting assemblies having only a single joint required to be sealed to prevent water intrusion. This characteristic reduces the risk of water intrusion over conventional assemblies, which include two or more such joints. It also may improve production assembly speeds.

Embodiments of the innovative lighting assemblies may include two printed circuit board assemblies (PCBAs). One of the board assemblies may contain the LEDs, while the other may include the drive electronics. Because of its need for heat dissipating, the PCBA containing the LEDs may be attached to the heat sink. Further, the heat sink may have a hole in its center, which may be advantageous as heat is dissipated principally at the perimeter of the board.

It thus is an optional, non-exclusive object of the present invention to provide lighting assemblies.

It is also an optional, non-exclusive object of the present invention to provide lighting assemblies having improved heat-dissipation properties, water-intrusion-resistance properties, or both.

It is another optional, non-exclusive object of the present invention to provide nicheless lighting assemblies principally for use in swimming pools and spas.

Other objects, features, and advantages of the present invention will be apparent to persons skilled in the relevant art with reference to the remaining text and the drawings of this application.

DETAILED DESCRIPTION

Figure 1:
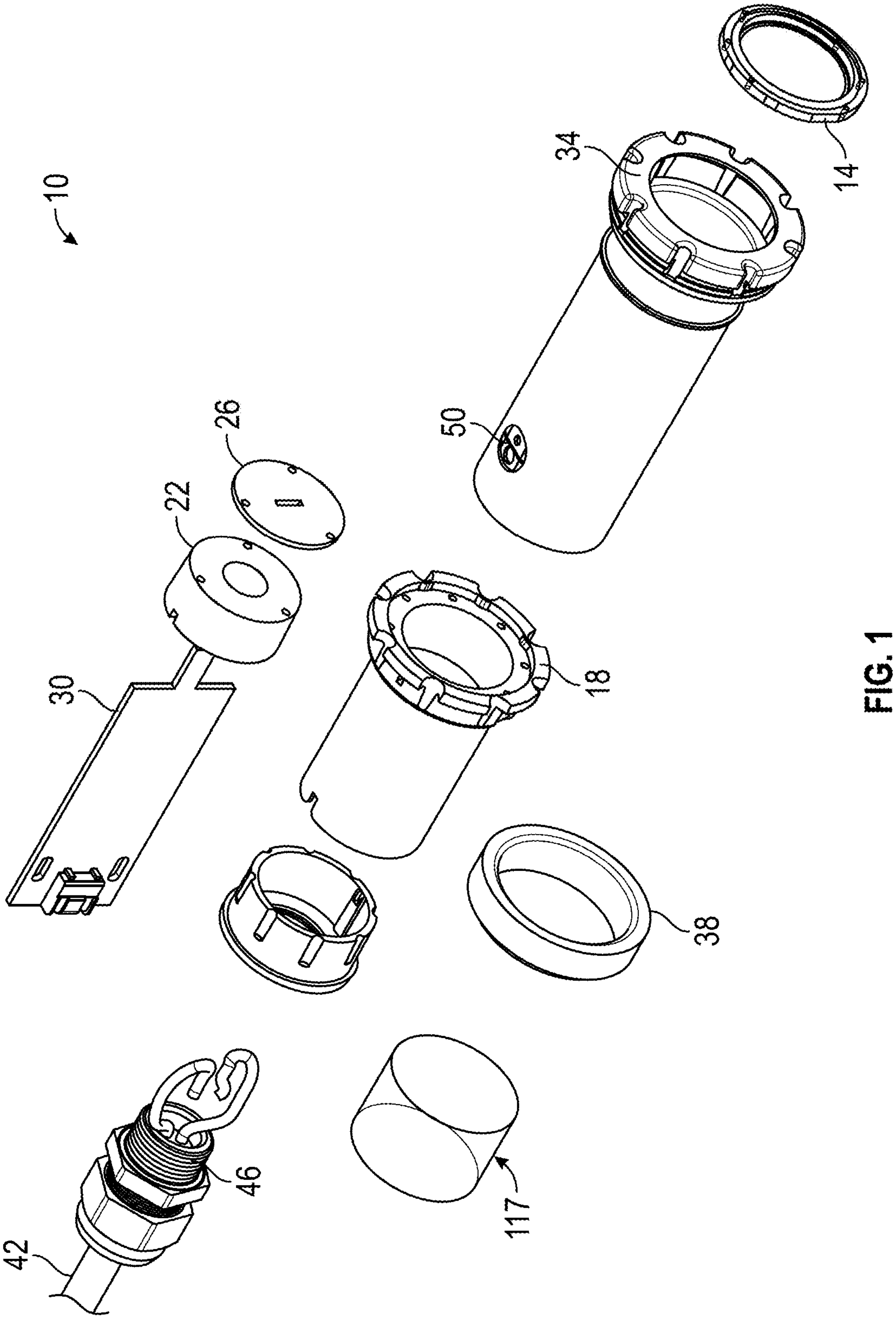
FIG. 1 is a view of components of an exemplary lighting assembly of the present invention.

Certain features of the present invention are illustrated in the appended FIGS. 1-4. Depicted in an exploded view in FIG. 1 are components of an exemplary lighting assembly 10 consistent with the present invention. Assembly 10 may comprise, among other constituent parts, lens 14, heat spreader 18, heat sink 22, first PCBA 26, and second PCBA 30. Both heat spreader 18 and heat sink 22 preferably are formed of aluminum, although other metals or materials with high thermal conductivity may be used instead. As illustrated, heat sink 22 is generally annular, with a central hole (as discussed above), and heat spreader 18 preferably is generally tubular in shape. If desired, lens 14 may contain a diffusing fill so as to appear "foggy."

Figure 2:
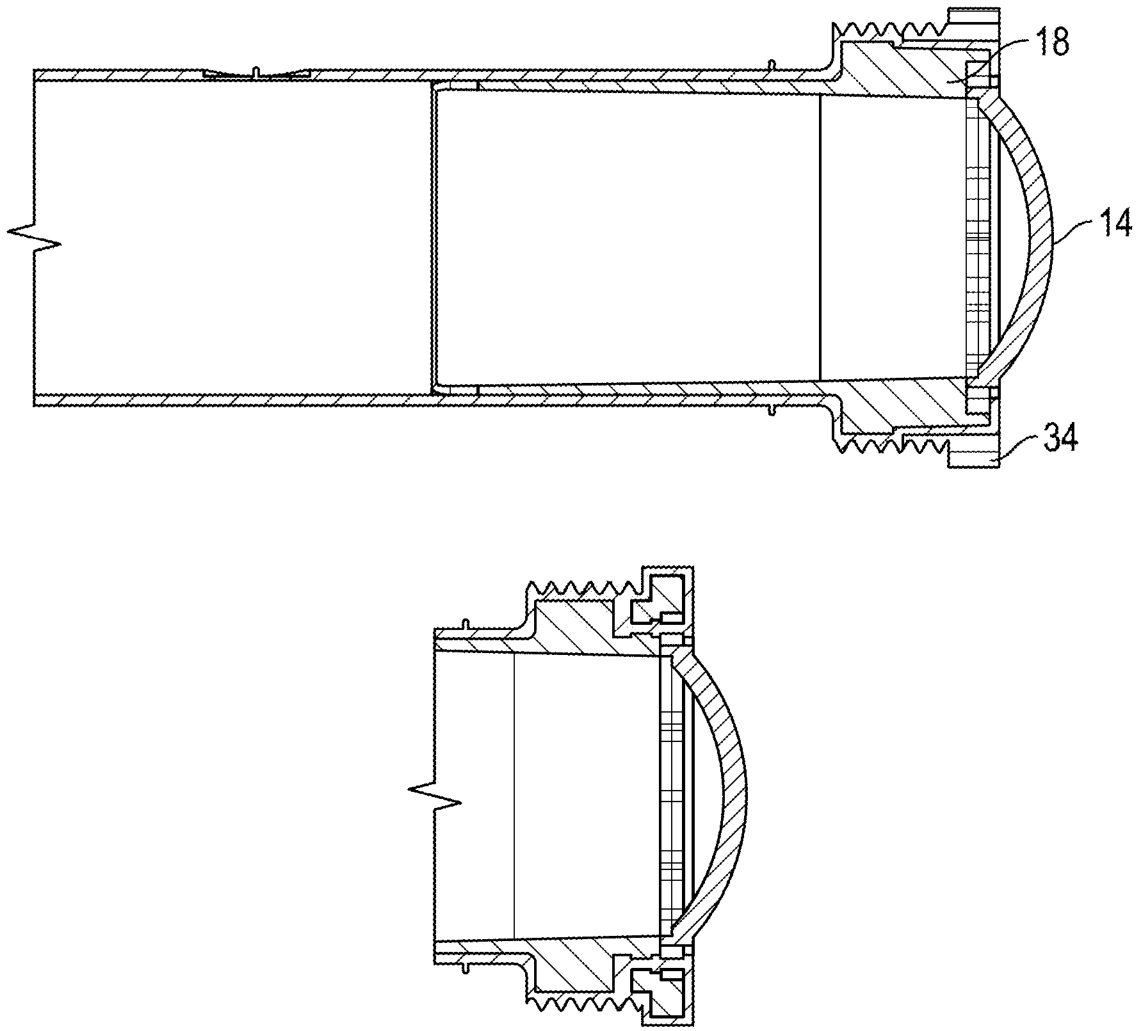
FIG. 2 are additional views of portions of the lighting assembly of FIG. 1.

FIGS. 1-2 show a thermally-conductive plastic 34 such as (but not necessarily) a composite material formed of polyphenylene sulfide (PPS) and graphite. As detailed especially in FIG. 2, plastic 34 may be overmolded onto heat spreader 18 and lens 14. Doing so prevents metallic heat spreader 18 from being exposed (to, for example, pool water) while maintaining ability to employ its good thermal conductivity to help dissipate heat from within assembly 10.

Figure 3:
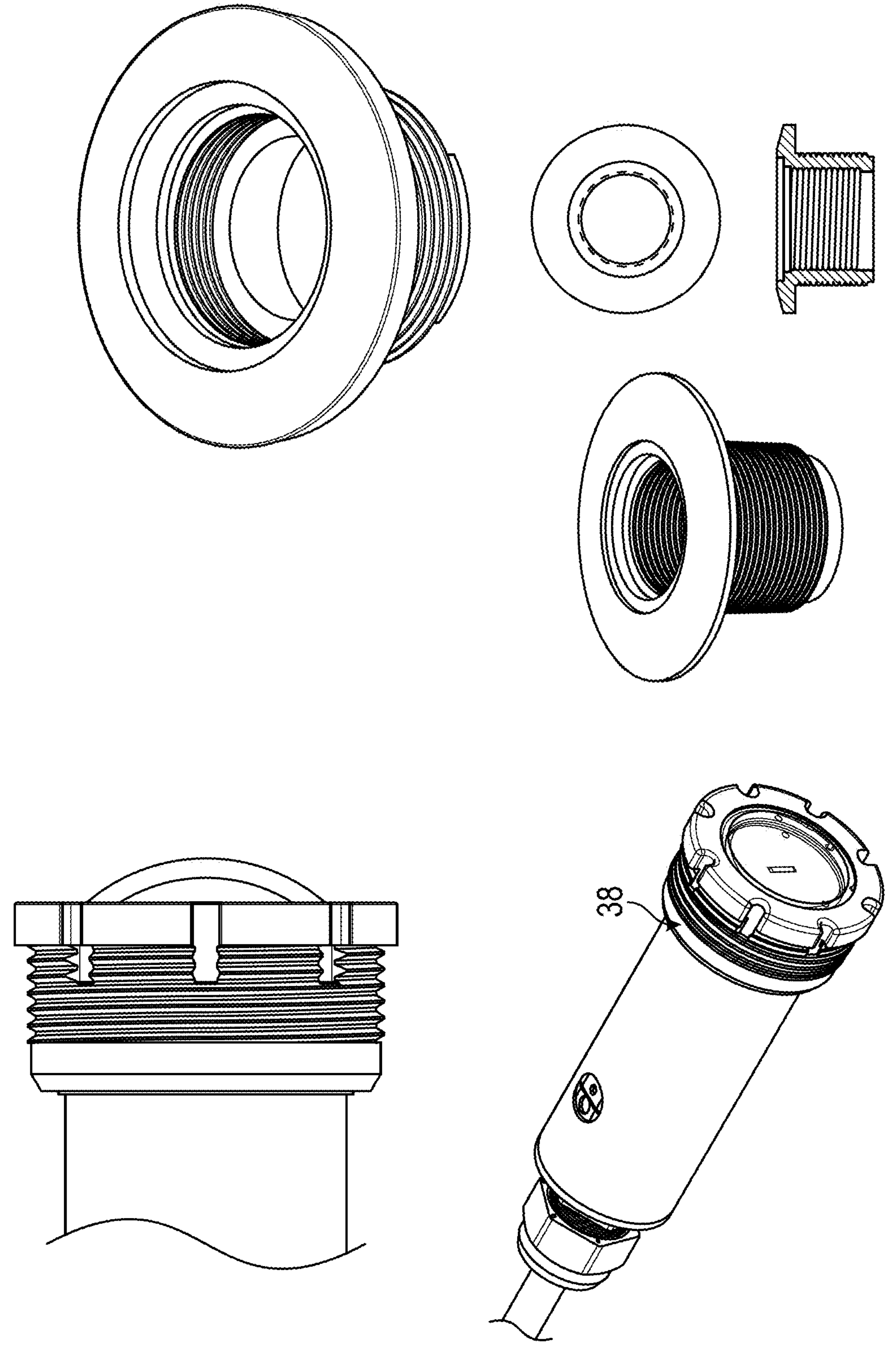
FIG. 3 are additional views of portions of the lighting assembly of FIG. 1 together with views of a pool fitting into which the lighting assembly may be installed.

FIGS. 1 and 3 depict gasket 38 which may be included as part of lighting assembly 10. Gasket 38 may be made of silicone, for example, and function to seal against a fitting of a pool.

Figure 4:
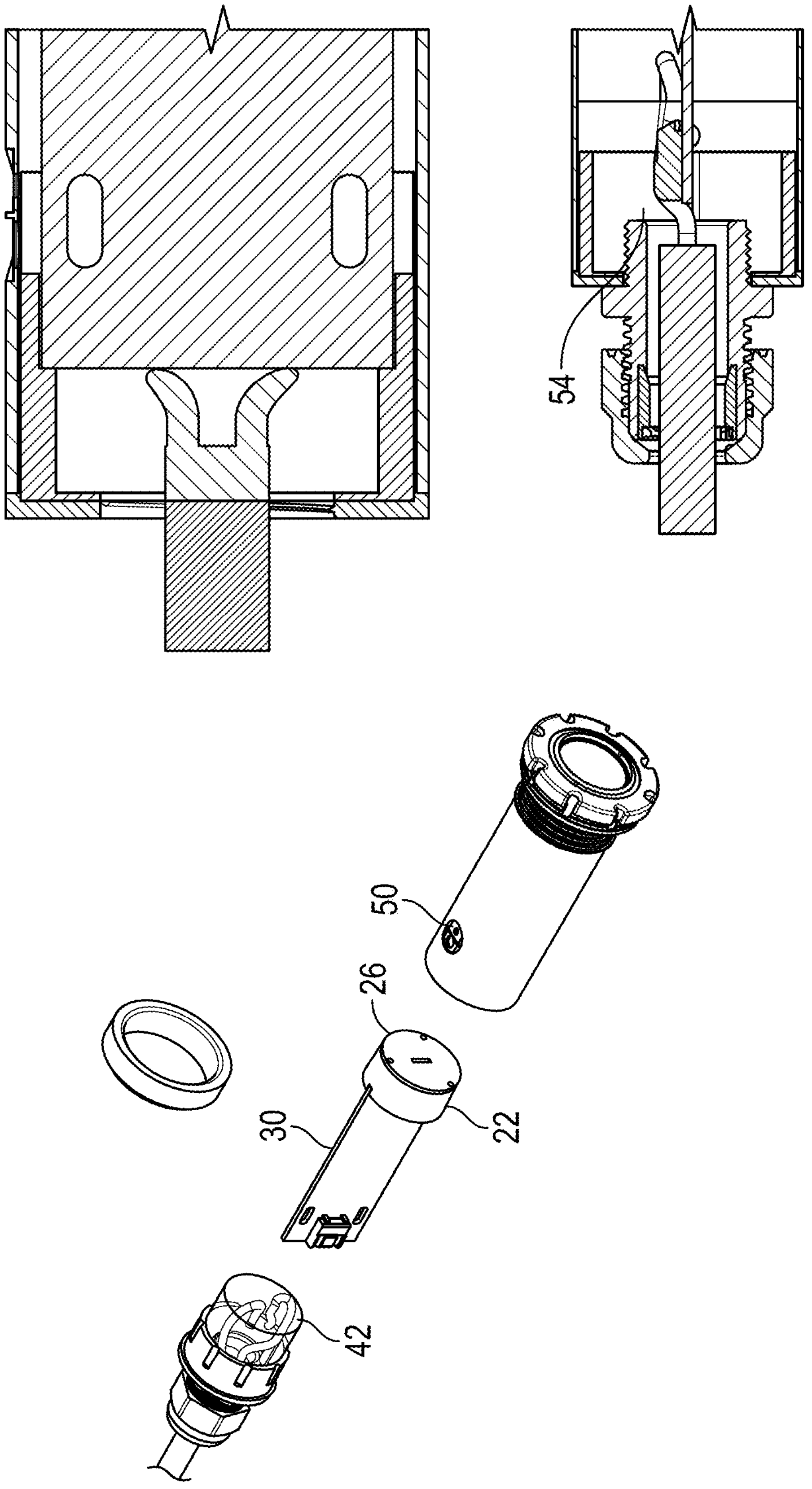
FIG. 4 are additional views of portions of the lighting assembly of FIG. 1.

FIG. 4, finally, details some actions beneficial in assembling lighting assembly 10. Electrical or optical wiring 42 (which may include suitable strain relief 46) may be connected to second PCBA 30, and a first subassembly including second PCBA 30, heat sink 22, and first PCBA 26 may be slid into a second subassembly comprising plastic 34, lens 14, and heat spreader 18. As shown in FIGS. 1 and 4, plastic 34 may define at least one opening 50 through which potting material 54 may be introduced from outside of assembly 10. Introducing potting material 54 preferably is a (or the) final step in assembling assembly 10, as material 54 functions not only to fix position of wiring 42 within the assembly 10, but also to seal the single seam present in the assembly 10.

Appended FIGS. 1A-10A and 4B illustrate further features of the present invention. As shown therein, exemplary lighting assembly 110 optionally may comprise, among other constituent parts, lens 114, heat spreader 118, heat sink 122, first PCBA 126, second PCBA 130 (see FIG. 2A), and gasket 138. Additionally depicted is a thermally-conductive plastic 134 that may be overmolded onto heat spreader 118 and lens 114. Each of these components may, but need not necessarily, be similar or identical to, or function like, corresponding components of assembly 10 as depicted in FIGS. 1-4. In particular, assembly 110 may be designed so that plastic 134 is exposed to pool water whereas metallic heat spreader 118 is not.

Figure 1A:
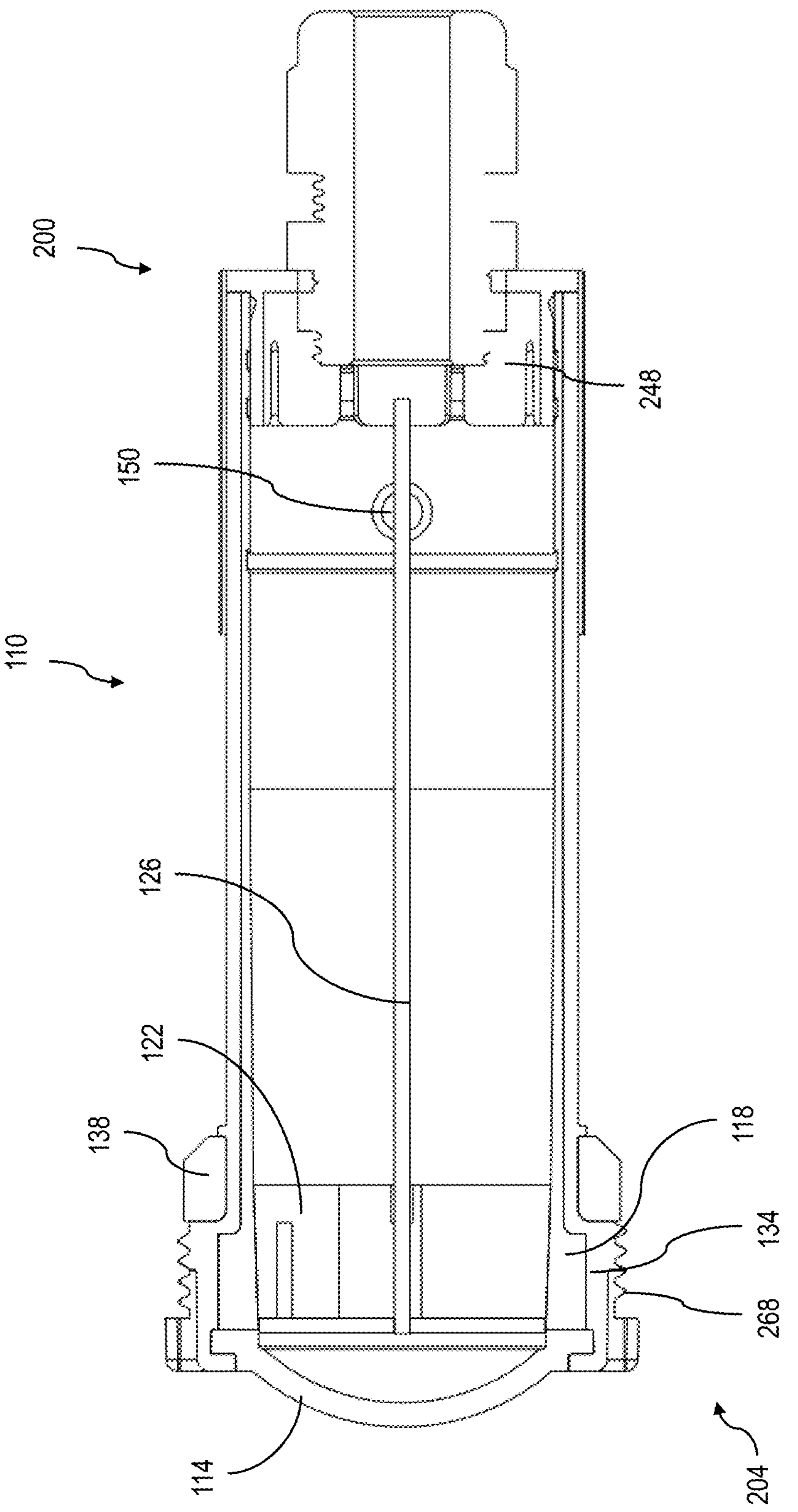
FIGS. 1A, 2A, 3A, 4A-B, 5A, 6A, 7A, 8A, 9A, and 10A are views of another exemplary lighting assembly of the present invention.
Figure 2A:
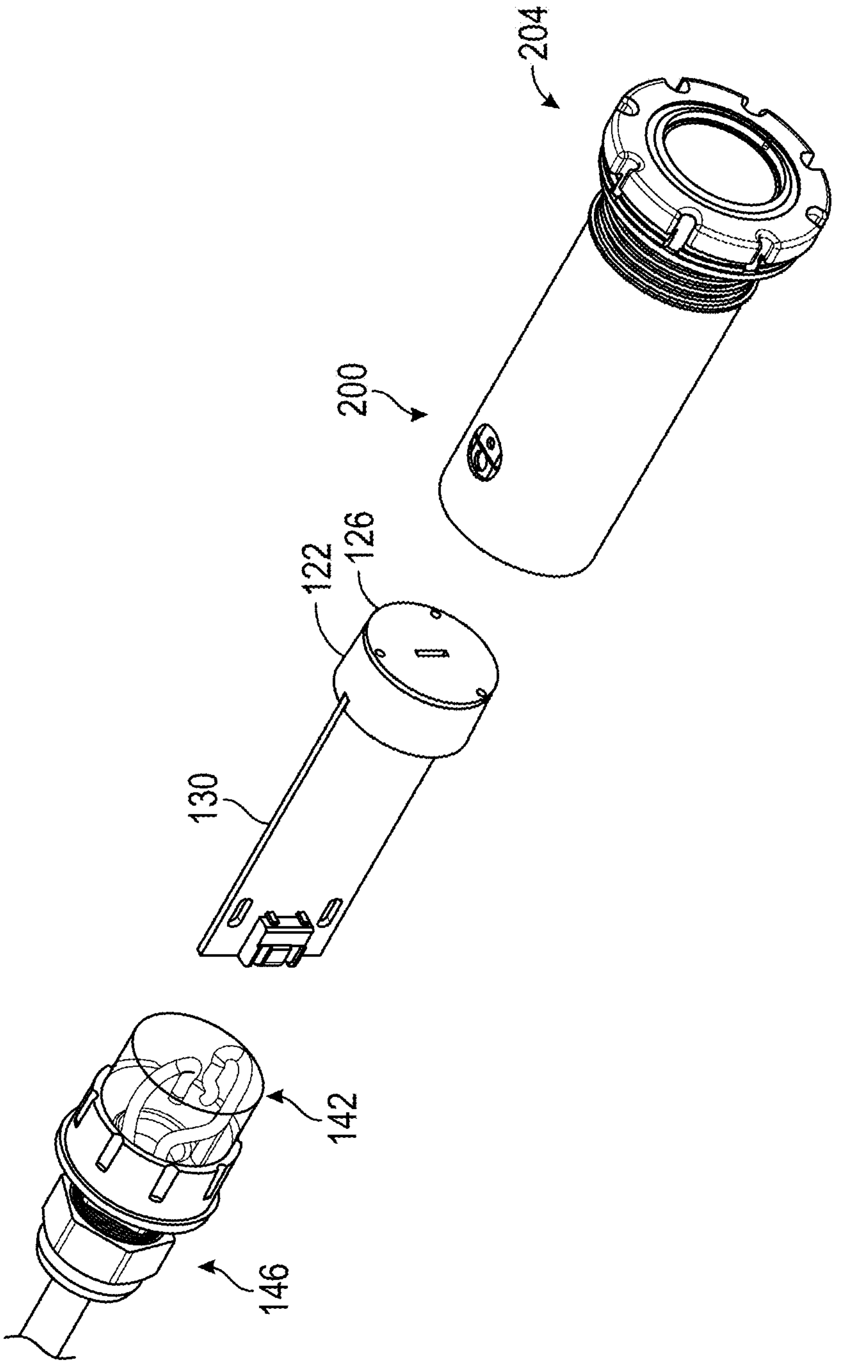

Opening 150 appears as well in FIG. 1A. Like opening 50, opening 150 allows potting material to be introduced into assembly 110 from outside thereof. Opening 150 advantageously may be positioned closer to a rear, or bottom 200 of assembly 110 than to a front, or top 204 of the assembly 110. As shown in FIG. 2A, electrical or optical wiring 142 (which may include suitable strain relief 146) may be connected to second PCBA 130, and a first subassembly including second PCBA 130, heat sink 122, and first PCBA 126 may be slid into a second subassembly comprising plastic 134, lens 114, and heat spreader 118. The first subassembly beneficially is inserted into the second subassembly at bottom 200, as overmolded plastic 134 generally inhibits insertion from top 204.

Figure 3A:
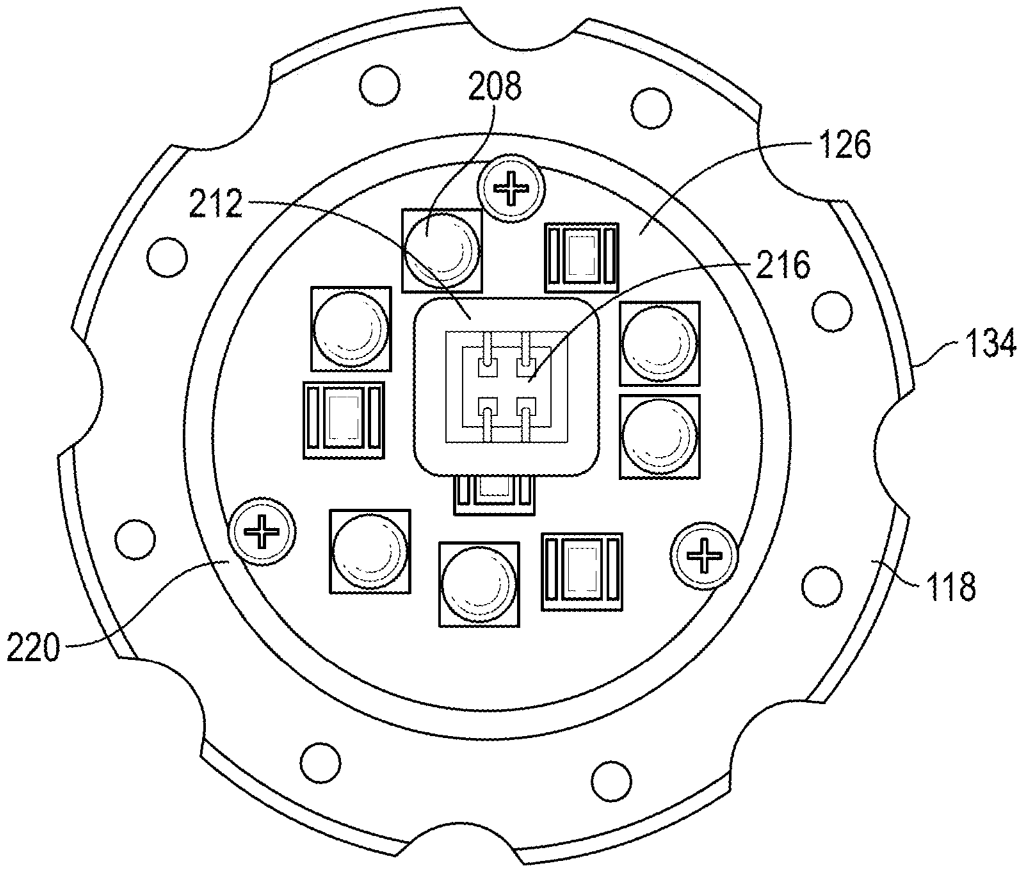

FIG. 3A illustrates an exemplary first PCBA 126. First PCBA 126 may include LEDs 208, nine of which (marked W1-W9) are depicted in FIG. 3A. Persons skilled in the art will, of course, recognize that more or fewer than nine LEDs 208 may be employed instead.

Shown too in FIG. 3A is shield 212. Shield 212 may cover connector 216 utilized to connect first PCBA 126 to second PCBA 130. Shield 212 advantageously safeguards LEDs 208 from being adversely affected by volatile organic compounds (VOCs) released from, e.g., second PCBA 130 as heating occurs. Thermal grease 220 also may be employed between heat spreader 118 and heat sink 122 in order to dissipate heat that otherwise might adversely impact LEDs 208.

Figure 4A:
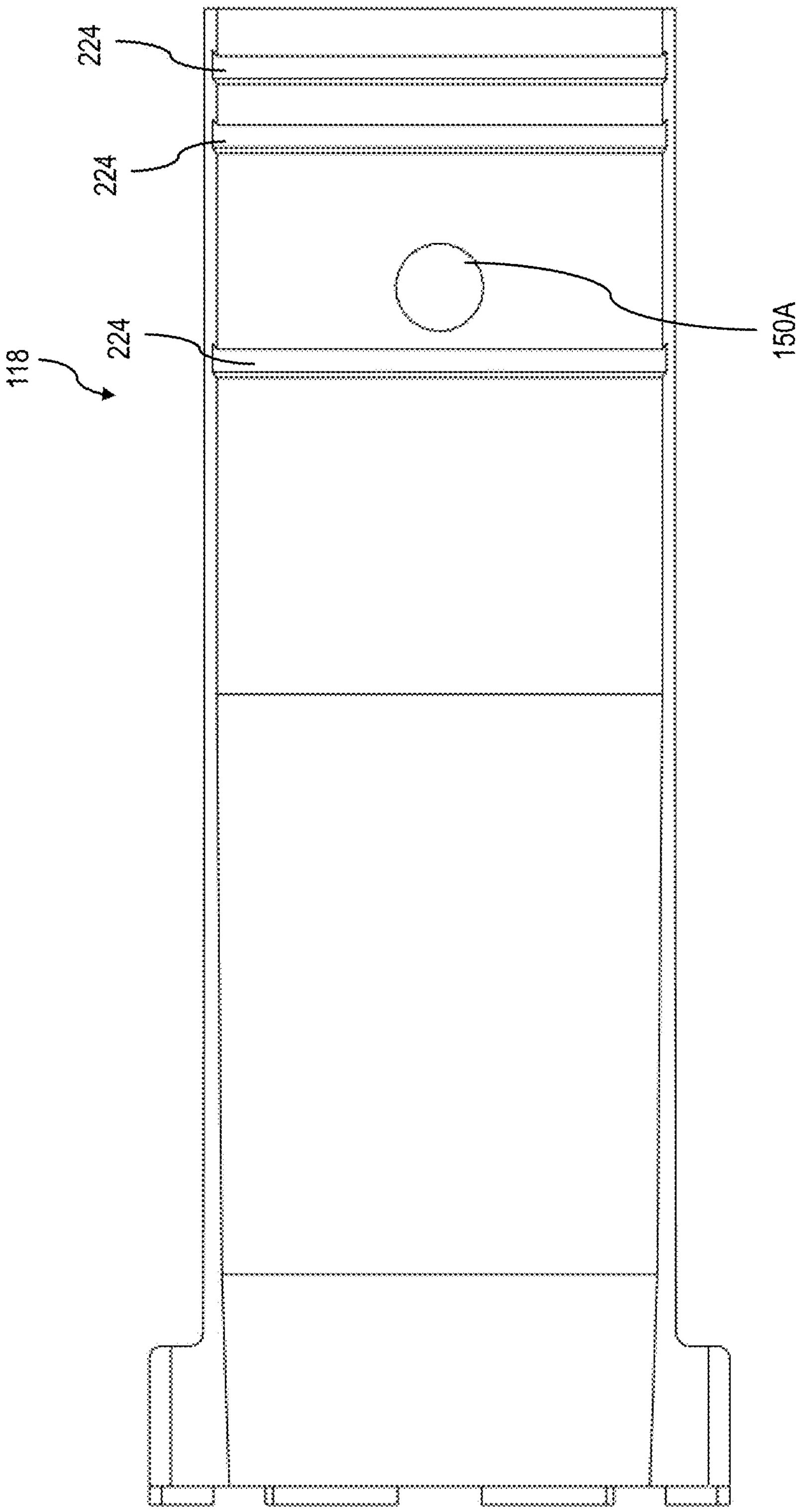
Figure 4B:
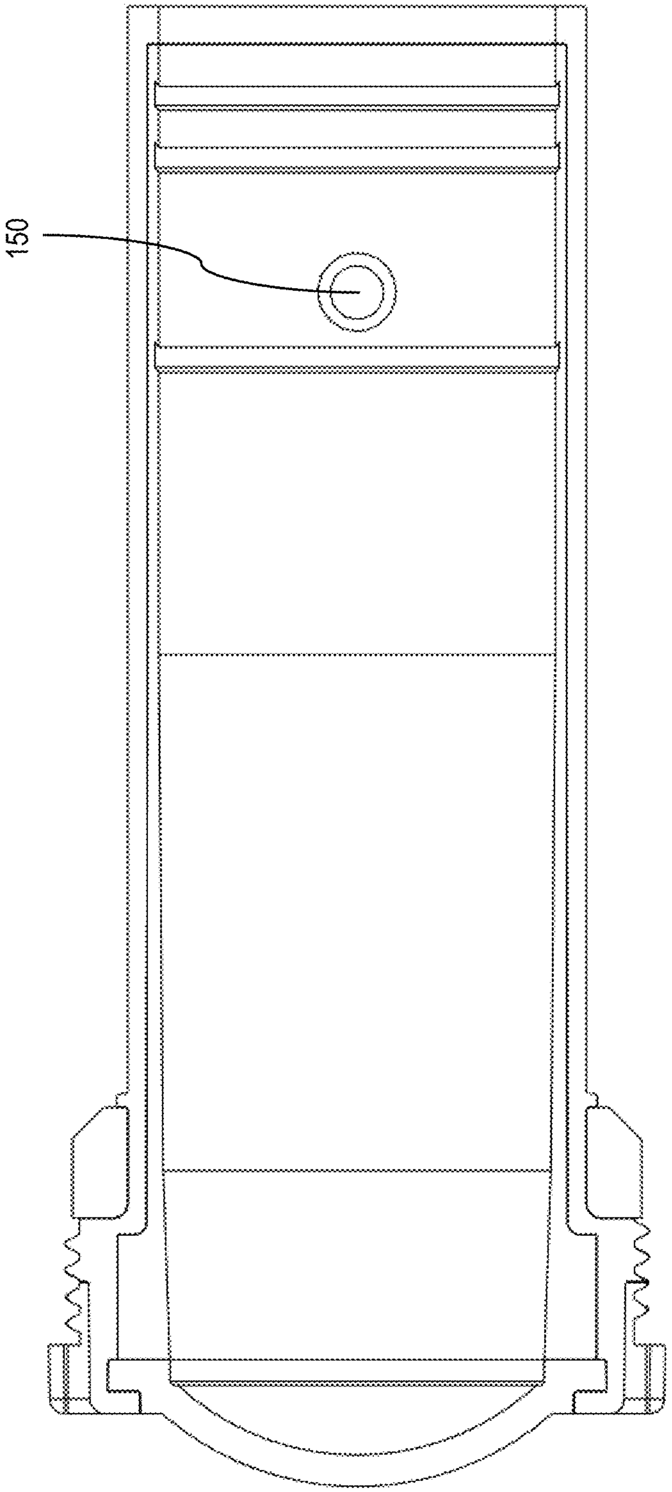

A cross-sectional view of heat spreader 118 is included as FIG. 4A. Heat spreader 118 preferably includes grooves 224 both above and below opening 150A. The grooves 224 may be filled with potting material introduced through opening 150A so as to provide water-tight seals protecting the internal remainder of assembly 110.

Opening 150A of heat spreader 118 and a corresponding opening 150B of plastic 134 (see FIG. 10A) collectively may form opening 150 through which potting material may be introduced. Heat spreader 118 and plastic 134 thus may be configured so that openings 150A and 150B align when assembly 110 is assembled. Such alignment is illustrated in, e.g., FIG. 4B.

Figure 5A:
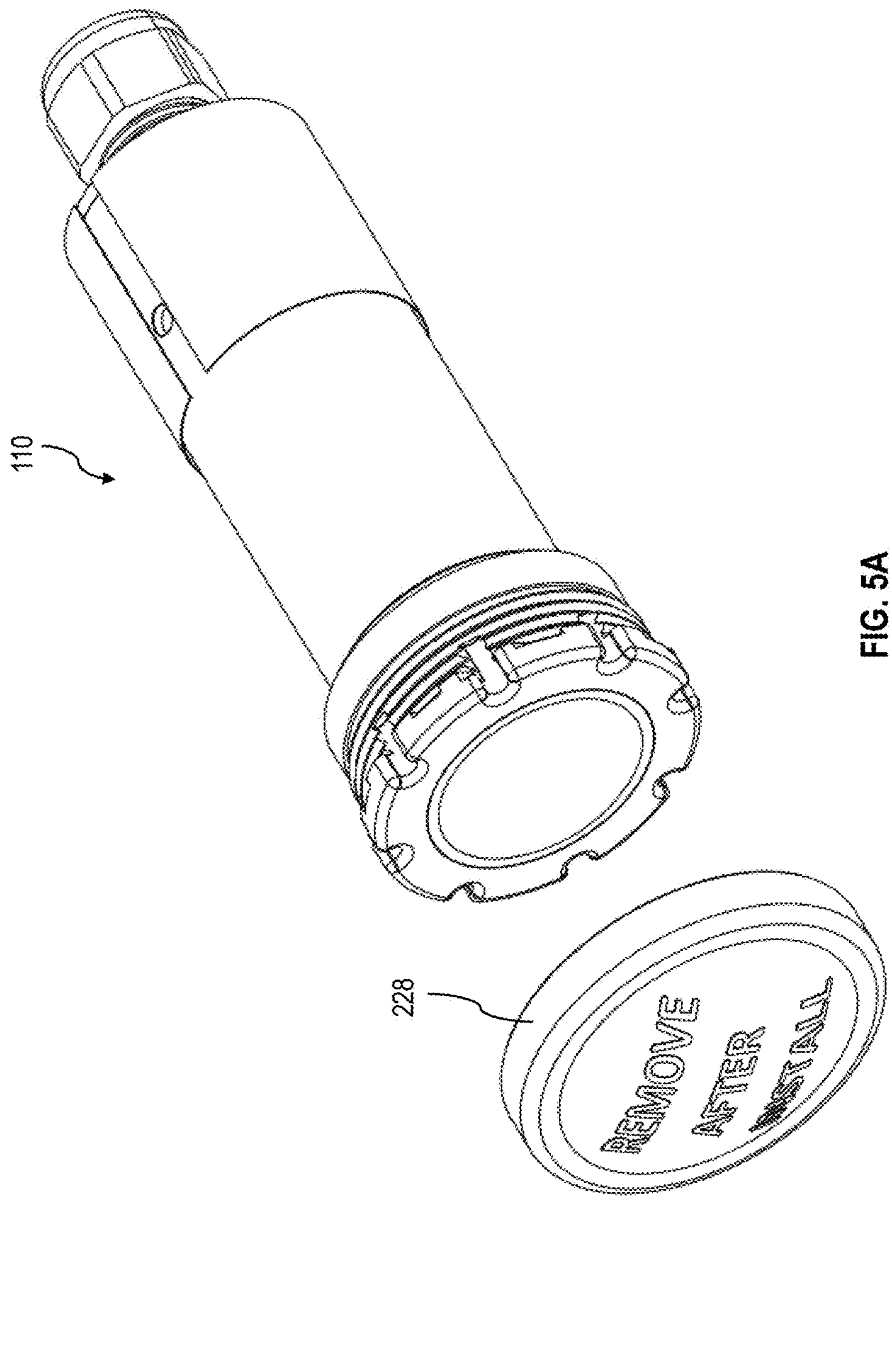

FIG. 5A shows protective cover 228 that may be used in connection with assembly 110. Protective cover 228 is intended to provide temporary protection for at least lens 114 during, for example, installation of assembly 110 in a pool or spa. Protective cover 228 may be removable when assembly 110 is ready for use.

Figure 6A:
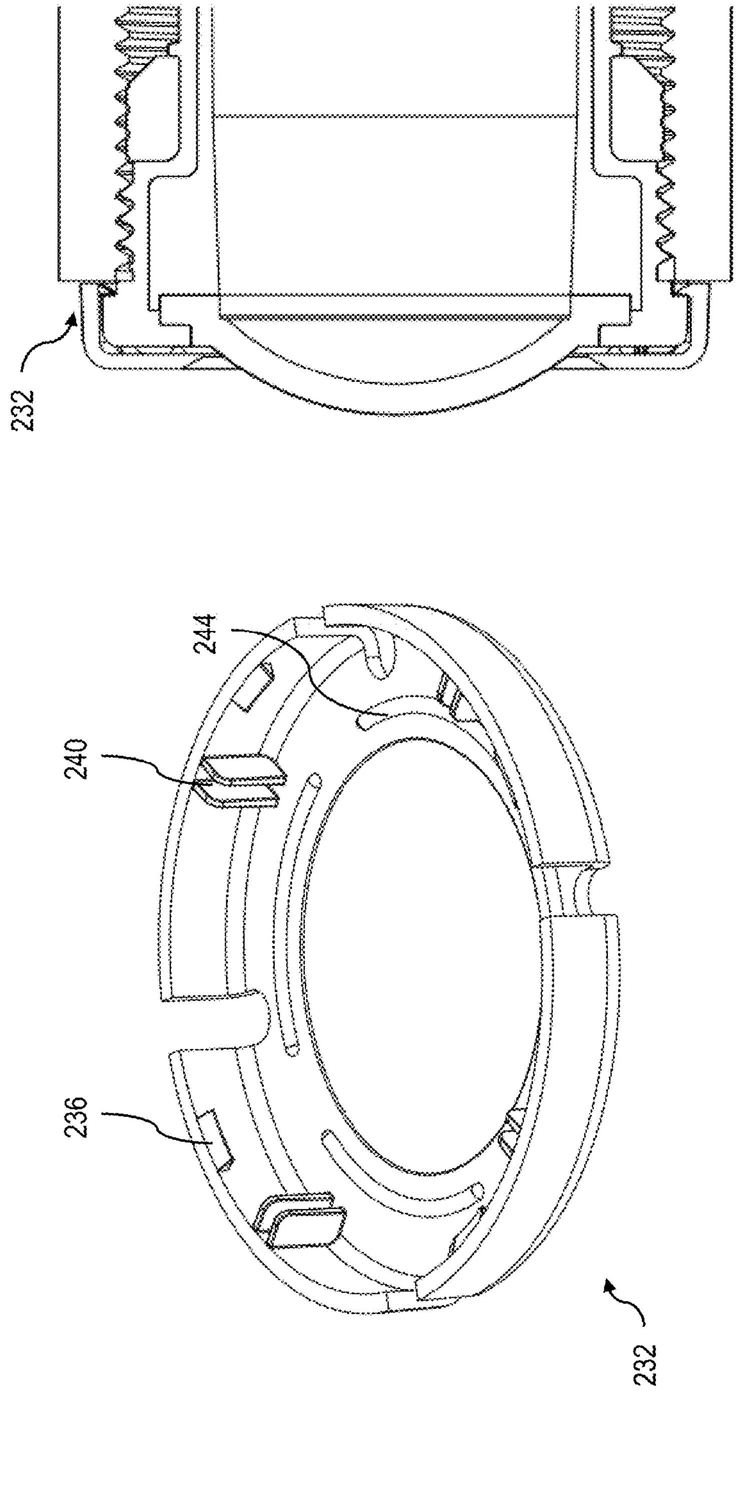

Cover 232 appears in FIG. 6A. By contrast with protective cover 228, cover 232 preferably is not temporary but rather remains in place when assembly 110 is installed. Cover 232 may include attachment means such as snap hooks 236 and alignment ribs 240. Standoff ribs 244, further, may allow pool water to interact with covered portions of lens 114 for cooling purposes.

Figure 7A:
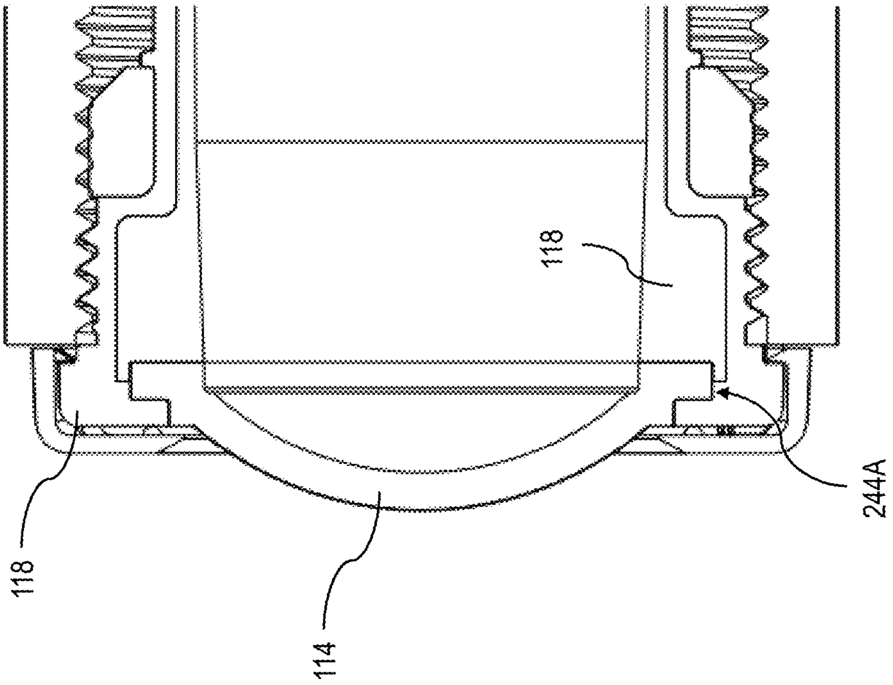

As shown in FIG. 7A, lens 114 may be seated within recess 244A of heat spreader 118. Such seating supports lens 114 within assembly 110, helping distribute impact forces potentially experienced by the lens 114.

Figure 8A:
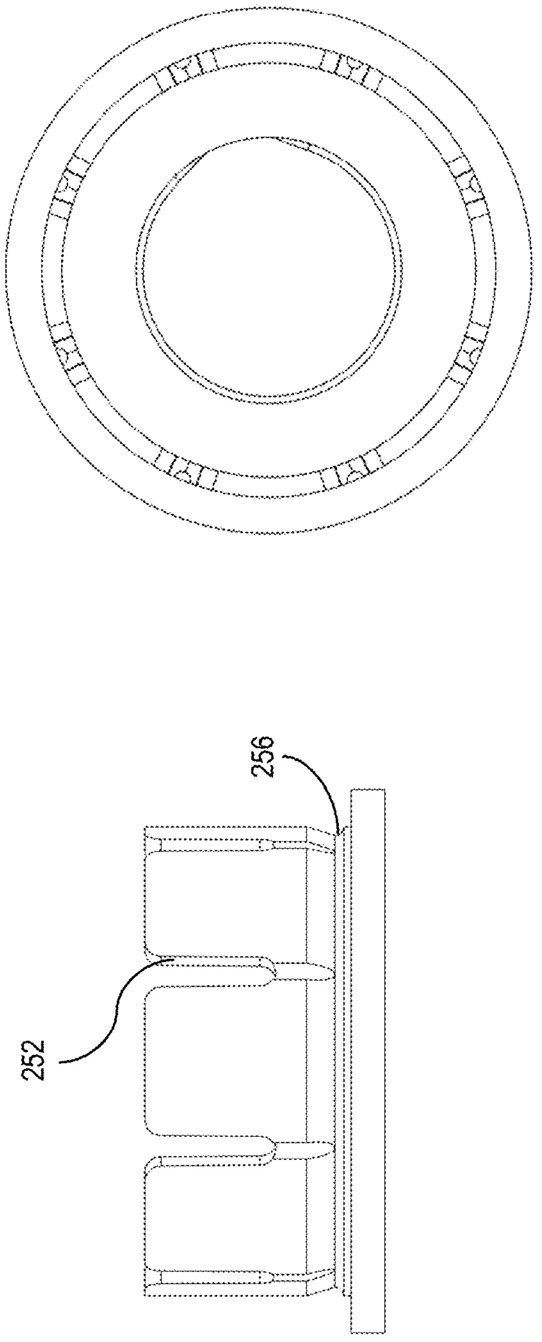

End cap 248 may be present at bottom 200 of assembly 110. Illustrates in FIG. 8A is that end cap 248 may include flexible fingers 252 to allow potting material introduced through opening 50 to reach bottom 200. Groove 256 of end cap 248 further receives potting material to create a seal when assembly 110 is potted.

Figure 9A:
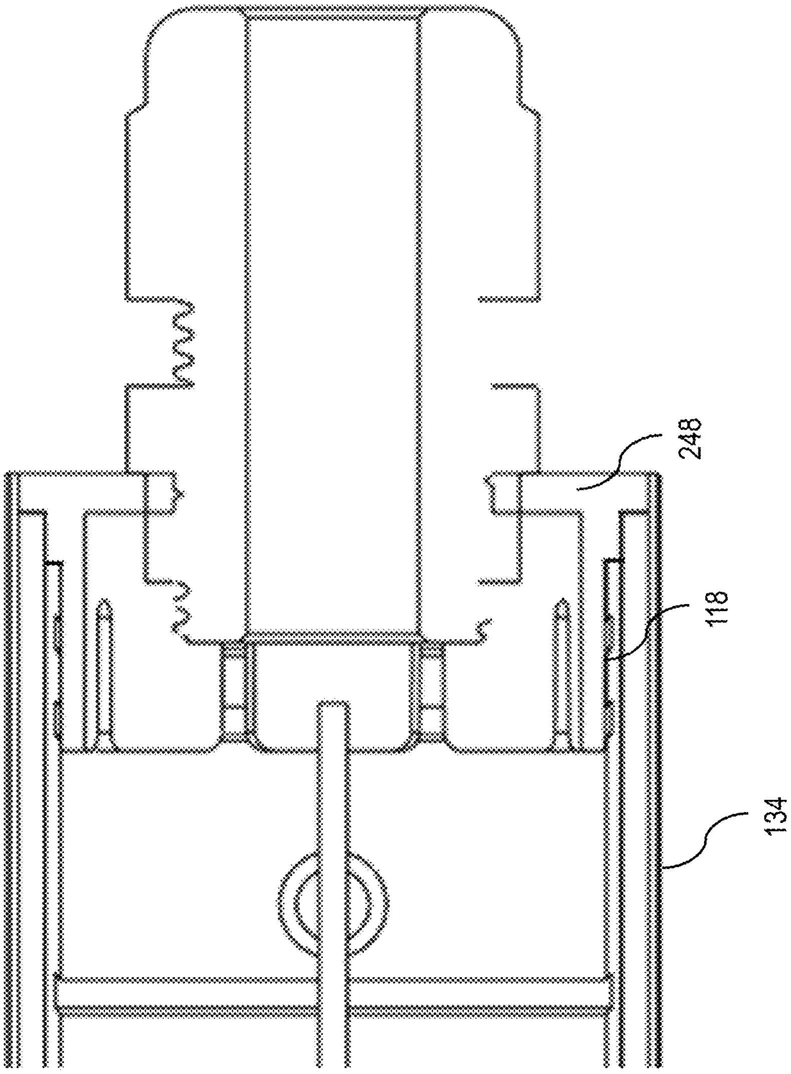
Figure 10A:
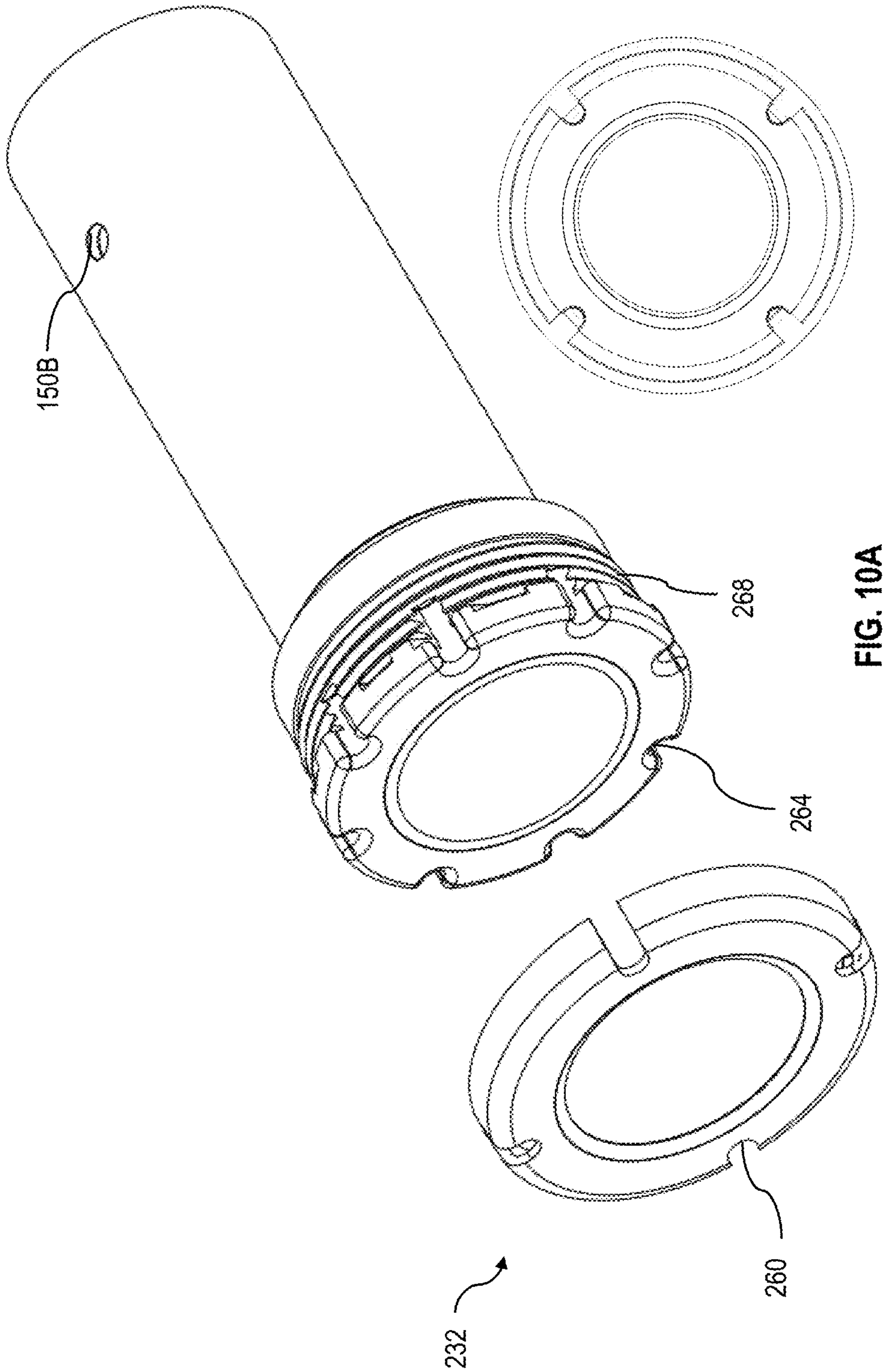

Heat spreader 118 desirably may terminate short of the outermost portion of end cap 248, as shown in FIG. 9A. This termination further reduces the likelihood of heat spreader 118 coming into contact with pool water in use. Cover 232, finally, may include grooves 260 (see FIG. 10A). Together with grooves 264 of plastic 134, grooves 260 facilitate installation of assembly 110. Grooves 260 and 264 also permit water flow into threads 268 for cooling purposes.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A lighting assembly comprising:
a light source;
a lens;
a heat spreader, wherein the heat spreader overlaps an outermost side periphery of the lens; and
a thermally-conductive plastic overmolded onto the heat spreader and the lens,
wherein the thermally-conductive plastic comprises a first end and a second end opposite the first end, wherein the thermally-conductive plastic is overmolded onto the lens proximate to the first end, and wherein the thermally-conductive plastic further comprises a plurality of grooves at the first end, the plurality of grooves spaced circumferentially around an external perimeter of the thermally-conductive plastic.

2. The lighting assembly of claim 1, wherein the heat spreader comprises a recess, and wherein the lens is seated within the recess of the heat spreader.

3. The lighting assembly of claim 1, wherein the lighting assembly comprises a top end and a bottom end opposite the top end, and wherein the thermally-conductive plastic includes a first opening (i) positioned closer to the bottom end than to the top end and (ii) through which potting material is introduced.

4. The lighting assembly of claim 1, further comprising a removable protective cover overlying the lens.

5. The lighting assembly of claim 1, further comprising an annular cover comprising at least one standoff rib configured to allow water to interact with the lens for cooling.

6. The lighting assembly of claim 5 in which the annular cover further comprises an attachment means.

7. The lighting assembly of claim 1, wherein the lighting assembly comprises a top end and a bottom end opposite the top end, and wherein the lighting assembly further comprises an end cap at the bottom end.

8. The lighting assembly of claim 7, wherein the end cap further comprises a groove configured to receive potting material.

9. A lighting assembly comprising:
- a light source;
- a lens;
- a heat spreader, wherein the heat spreader overlaps an outermost side periphery of the lens; and
- a thermally-conductive plastic overmolded onto the heat spreader and the lens,
- wherein the lighting assembly comprises a top end and a bottom end opposite the top end, and wherein the lighting assembly further comprises an end cap at the bottom end, wherein the end cap comprises an outermost portion and flexible fingers extending from the outermost portion.

10. The lighting assembly of claim 9, wherein the thermally-conductive plastic overlaps at least a portion of the end cap in a radial direction.

11. The lighting assembly of claim 9, further comprising a cover at the top end and overlapping at least a portion of the lens and a portion of the heat spreader, wherein the cover is attached to the heat spreader using attachment means.

12. A lighting assembly for illuminating water of a swimming pool or spa, comprising:
- a light source;
- a lens;
- a heat spreader; and
- a thermally-conductive plastic overmolded onto at least one of the heat spreader or the lens, wherein the thermally-conductive plastic comprises a water-facing surface that is exposed to the water of the swimming pool or spa.

13. The lighting assembly of claim 12, further comprising a cover configured in use to protect at least parts of the thermally-conductive plastic and the lens and removable from the lens, wherein the cover covers at least a portion of a front side of the lens facing away from the light source.

14. The lighting assembly of claim 12, wherein the lens comprises a periphery surrounded by the thermally-conductive plastic.

15. The lighting assembly of claim 12, wherein the lighting assembly comprises a top end and a bottom end opposite the top end, and wherein the lighting assembly further comprises an end cap at the bottom end.

* * * * *